(12) United States Patent
Skidmore et al.

(10) Patent No.: US 11,151,791 B2
(45) Date of Patent: Oct. 19, 2021

(54) R-SNAP FOR PRODUCTION OF AUGMENTED REALITIES

(71) Applicant: EDX Technologies, Inc., Austin, TX (US)

(72) Inventors: Roger Ray Skidmore, Austin, TX (US); Blair Nelson Ahlquist, Eugene, OR (US); Dragomir Rosson, Webster, TX (US)

(73) Assignee: EDX Technologies, Inc., Austin, TX (US)

( * ) Notice: Subject to any disclaimer, the term of this patent is extended or adjusted under 35 U.S.C. 154(b) by 0 days.

(21) Appl. No.: 16/386,398

(22) Filed: Apr. 17, 2019

(65) Prior Publication Data

US 2019/0318543 A1   Oct. 17, 2019

Related U.S. Application Data

(60) Provisional application No. 62/658,871, filed on Apr. 17, 2018.

(51) Int. Cl.
*G06T 19/00* (2011.01)
*G06T 17/00* (2006.01)
*G06T 15/20* (2011.01)

(52) U.S. Cl.
CPC ............ *G06T 19/006* (2013.01); *G06T 15/20* (2013.01); *G06T 17/00* (2013.01); *G06T 2200/04* (2013.01); *G06T 2200/08* (2013.01)

(58) Field of Classification Search
None
See application file for complete search history.

(56) References Cited

U.S. PATENT DOCUMENTS

| | | | |
|---|---|---|---|
| 8,963,957 B2* | 2/2015 | Skarulis | G06T 19/006 345/633 |
| 10,360,729 B2* | 7/2019 | Montgomerie | G09B 5/14 |
| 2013/0342564 A1* | 12/2013 | Kinnebrew | G02B 27/017 345/619 |
| 2017/0243400 A1 | 8/2017 | Skidmore et al. | |
| 2017/0337352 A1* | 11/2017 | Williams | G06T 19/006 |
| 2018/0004283 A1* | 1/2018 | Mathey-Owens | G06F 3/017 |
| 2018/0108172 A1* | 4/2018 | Huston | G06T 7/521 |
| 2018/0276882 A1* | 9/2018 | Harviainen | G06T 17/10 |
| 2019/0122435 A1* | 4/2019 | Prideaux-Ghee | G06T 7/75 |

* cited by examiner

*Primary Examiner* — YuJang Tswei
(74) *Attorney, Agent, or Firm* — W&C IP

(57) ABSTRACT

Images and/or videos have associated therewith information like location and orientation information for the camera used to captured the images/videos. The associated location and orientation (or pose) information facilitates subsequent processing for producing accurate and convincing augmented reality (AR) outputs. In addition, some embodiments associate user-specific information with images or videos for producing customized AR content on a user-to-user basis.

20 Claims, 9 Drawing Sheets

R-SNAP FOR PRODUCTION OF AUGMENTED REALITIES

CROSS-REFERENCE TO RELATED APPLICATIONS

This application claims the benefit of U.S. Provisional Patent Application No. 62/658,871, filed Apr. 17, 2018, the complete contents of which are herein incorporated by reference.

FIELD OF THE INVENTION

The invention generally relates to augmented reality and, in some exemplary embodiments, customizing augmented reality based on metadata associated with real world content.

BACKGROUND

Images and videos captured by cameras may have metadata associated with the image/video data. For example, photographs captured with mobile phones at the time of filing this disclosure are frequently geocoded with some type of location information. However, images and videos presently have limited usability for creating realistic and convincing augmented reality experiences.

Another problem in the art of augmented reality is the different processes used by different AR-enabled devices. If different AR devices use different approaches, they can produce inconsistent results even if each uses the same base images or videos of the real world. Moreover, sometimes AR-enabled devices must exchange AR information. If two devices employ different processes for producing AR, they may be unable to exchange their respective AR content.

SUMMARY

According to an aspect of some exemplary embodiments of the invention, augmented reality is produced based on at least two types of information which may be collected and associated with images or videos that are used to produce augmented reality content. The first type of information describes camera perspective for base image(s) or video(s) of the real world. Perspective information describing a camera at a time the camera captures real world content in image(s) or video(s) is associated with the image(s) or video(s). The manner of association may be preservation of the perspective information as metadata which moves, copies, transfers, etc. with the real world image data (e.g., pixel color values). "Perspective" as used herein may refer to one or more of location, orientation, pose, position, and field of view.

The second type of information describes users, e.g., users who have some relationship to the image(s) or video(s). User-specific metadata may be associated with the image(s) or video(s), with different specifics being associated on a per user basis. For instance, if a first person takes a picture that is used in providing AR content to a second person and third person, the user-specific metadata may be employed to give different AR content to the second person as compared to the third person. The manner of association may be preservation of user-specific information as metadata which moves, copies, transfers, etc. with the real world image data (e.g., pixel color values). The nature of the AR content may depend on a viewer's identity, a viewer's credentials, user settings or selections respecting the appearance of AR content, and/or other factors. The nature of AR content may depend on a sender's identity, a recipient's identify, the identities or other characteristics of network contacts (e.g., on a social network which facilitates sharing of content used or usable for producing AR), and/or other considerations.

The first and second types of information (and/or other types of information, depending on the embodiment) are employed in combination for producing AR content which is both in semantic context with the real world content being augmented and customized for different users.

According to one aspect of some embodiments, metadata such as location and orientation are associated with images/videos, permitting the image(s)/video(s) to be augmented with accurate and convincing augmentations after the image(s)/video(s) is captured and distributed. The metadata may include pose, which comprises both orientation and position. The metadata may also or alternatively include one or more of: information controlling access to particular users, time of creation information, creator information, sender information, recipient information, intended recipient/s information, verification information, publisher information, and more.

According to another aspect of some embodiments, metadata of images and/or videos is used by one or more processors to determine AR content to serve to an end user (e.g., a human consuming the AR). In some embodiments, augmentation(s) are based on (e.g., dependent on) the user and differs from one user or individual to the next. The same base image(s) or video(s) may be served to a plurality of end users, with at least two different end users receiving different AR content. The AR content may be customized to individuals or to groups. The metadata associated with the image(s) or video(s) may be used to filter and/or select specific AR content from one or more repositories containing a more general assortment of available AR content. End user details (e.g., credentials, subscriptions, etc.) may be required as input at an end user device before customized AR content is generated for the end user.

According to another aspect of some embodiments, a plurality of processors may be employed to produce and deliver AR content in accordance with the invention. The processors may be networked at locations remote from one another.

According to another aspect of some embodiments, metadata is maintained with one or more image(s) (e.g., static images) or video(s) which allows for an easy, compact method to exchange AR information and base images/videos between AR-enabled devices. When shared with another user, the recipient's subscribed virtual content may be accurately added to (e.g., overlaid onto) an original real world image or video to produce customized AR content.

A 3D virtual model may be provided which is modeled after the real world. The virtual model may include representations of real world content such as content which appears in the captured images or video. For instance, a 3D virtual model for New York City may contain virtual representations of the Empire State Building, Wall Street, and other buildings, landforms, and structures in such relative locations and arrangements as to match as best as possible the real world arrangements of the real world buildings, landforms, and structures. The virtual model may be used as a backbone or framework for virtual reality content.

According to another aspect of some embodiments, based on perspective information (e.g., location, the field of view, the orientation, and assumptions about the near and far field limits (e.g., predetermined values for near and far field limits)), a 3D real world frustum may be determined. This real world frustum may be applied to a virtual world using virtual world data from one or more databases. Virtual objects which are inside the frustum may be identified as candidates for augmentation. The selection of augmentations based on the virtual object candidates may involve one or more criteria including, for example, user option selections and the relationships between different virtual objects. For instance, a processor may determine which of the virtual objects obscure parts of each other based on the frustum in the virtual world. A signal may be initiated to control the augmented reality output of an output device. The initiated signal contains information for the augmentations that were selected. In embodiments where the processor is arranged remotely from the output device (e.g., if the processor is part of a cloud server), the initiated signal may be transmitted over a network (e.g., the Internet) to reach the output device. In embodiments where the processor is part of or at least co-located with the output device, the initiated signal may simply be conveyed over hardwired connections. After the output device has the signal, the selected augmentations are provided as one or more of auditory, visual, or tactile output at a VR device.

DETAILED DESCRIPTION

Figure 1:
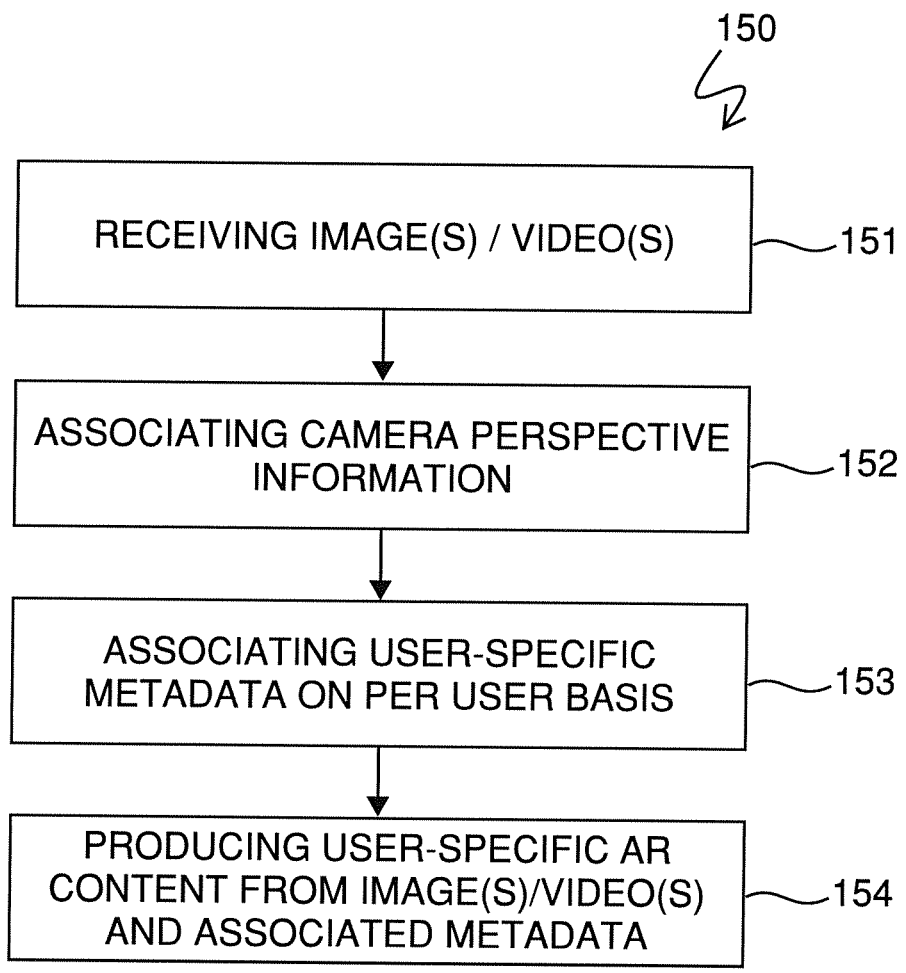
FIG. 1 is an exemplary method for augmented reality.

FIG. 1 is a flowchart of an exemplary method 150 for augmented reality (AR). Image or video containing real world content is received at block 151. The content of the image or video may be entirely real world content, in which case it may be referred to as a "base image" or "base video" herein. A camera collecting light reflected off real world objects produces a base image or base video. Alternatively to base images/videos, the content received at block 151 may contain more than real world content, e.g., it may already contain some virtual content. Block 151 may in some instances involve capturing the images or videos (e.g., with a camera). Block 151 may in some instances involve retrieving or receiving images or videos from a storage medium where they were stored for some duration of time since being captured. Ultimately, the AR content produced by method 150 is in semantic context with the real world content received at block 151. At least two types of information may be associated with the real world image(s) or video(s) received at block 151.

At block 152, perspective information is associated with the image or video. The perspective information describes a camera at a time the camera captured the image or video. "Perspective" as used herein may refer to one or more of location, orientation, pose, position, and field of view. If the image or video is a composite from multiple cameras, information for each of the cameras or a representative camera may be used. Exemplary perspective information includes a location and an orientation. Thus, at minimum, this would describe the camera's view with respect to the location from which the image or video is taken and a direction in which the camera was facing to capture the real world content contained in the image or video.

"Position" and "location" are similar terms and may sometimes (but not necessarily always) be used interchangeably in the art. "Location" is especially prevalent when used in the context of geography or a system of reference used for describing geography (e.g., GPS). "Position" is more common in the context of coordinate systems generally, especially those which are fairly independent of geography (e.g., the Cartesian coordinate system). Both "position" and "location" may be expressed as a point. Unlike "position" however, "location" may be expressed as a region, space, or area. For example, a street corner may be a location, or an entire town may be a location.

"Location" and "position" may be used to refer to a place where something is, e.g., in a Cartesian coordinate system (or some other coordinate system). As compared with orientation, location may be characterized as linear position whilst orientation may be characterized as rotational position. Location information may be absolute (e.g., latitude, longitude, elevation, and a geodetic datum together may provide an absolute geo-coded position requiring no additional information in order to identify the location), relative (e.g., "2 blocks north of latitude 30.39, longitude −97.71 provides position information relative to a separately known absolute location), or associative (e.g., "right next to the copy machine" provides location information if one already knows where the copy machine is; the location of the designated reference, in this case the copy machine, may itself be absolute, relative, or associative). Absolute location or position involving latitude and longitude may be assumed to include a standardized geodetic datum such as WGS84, the World Geodetic System 1984. In the United States and elsewhere the geodetic datum is frequently ignored when discussing latitude and longitude because the Global Positioning System (GPS) uses WGS84, and expressions of latitude and longitude may be inherently assumed to involve this particular geodetic datum. For the present disclosure, absolute location or position information may use any suitable geodetic datum, WGS84 or alternatives thereto.

"Orientation" may be a rotational position (whereas location may be a linear position). Orientation may also be referred to interchangeably as attitude. Even when constrained to a single location, an object may physically take any of a variety of orientations unless further constraints are in place. Orientation may be expressed according to a direction (e.g., a unit vector). Location and orientation together may describe an object according to the six degrees of freedom in three dimensional space.

"Pose" is a term which may be used to refer to position and orientation in the collective.

At block 153, user-specific metadata is associated with the image(s) or video(s). Metadata may be associated on a per user basis. Users, as used herein, may refer to agents which have an interactive relationship with the original image or video and/or the AR content produced therefrom. An example user is a person or device responsible for capturing the original image or video. From an intellectual property perspective, this user may be an original copyright owner. Another example user is a person or device responsible for creating virtual content a selection of which contributes to the ultimate AR content being produced. Another example user is an end user, which is to say a consumer of the AR content. Consuming AR content involves experiencing the content, which is most often but not limited to viewing the content. Another example user is a person or device with has certain privileges to the real world content of the image/video and/or the virtual content used for augmentation and/or the AR content (which is generally some combination of real world content and virtual content).

User-specific metadata associated with an image or video may differentiate between at least three user types including i) entities (e.g., persons) responsible for originally capturing the image or video, ii) entities responsible for creating virtual content included in the AR content, and iii) entities intended to consume the user-specific AR content produced.

At block 154, AR content is produced. Block 154 may involve producing user-specific AR content from the image or video based on the perspective information (of block 152) and the user-specific metadata (of block 153), whereby different users receive different AR content derived from the same real world content (of block 151).

Figure 2:
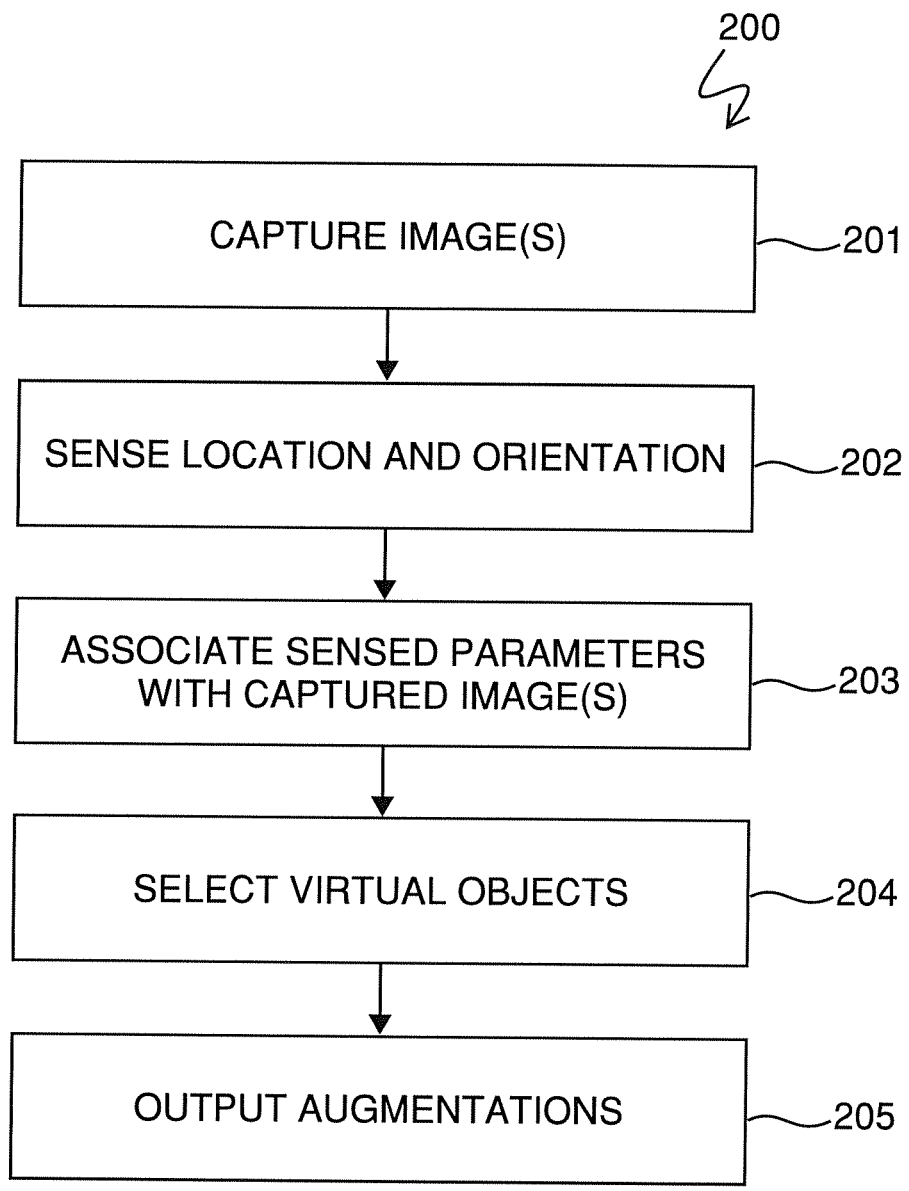
FIG. 2 is another exemplary method for augmented reality.

FIG. 2 is a flowchart of another exemplary method for producing an augmented reality (AR). The end result of the method may comprise both real content and virtual content. A fully renderable virtual model of the real world may act as a backbone or framework for some or all of VR content used in an embodiment. A virtual model may be configured as a container or source of AR content (e.g., AR content incorporated into the 3D virtual model). A virtual model may be configured as the basis for determining what AR content to show (e.g., the camera pose determines field of view which determines a portion of the virtual model in view which determines what relevant AR content is available).

"Virtual model" and "virtual world" may be used interchangeably. Since the real world is three-dimensional (3D), a corresponding virtual model may also be characterized as 3D but need not necessarily be so (i.e., a model may be two-dimensional; a model may be four dimensional and include time; a model may be multidimensional with one or more of a plurality of spatial dimensions, a temporal dimension, and other dimensions like color). An exemplary virtual model has virtual locations which are configured to correspond with real world locations. In other words, the virtual model may include a virtual landscape modeled after the real world landscape. Real world geography, locations, landscapes, landmarks, structures, and the like, natural or manmade, may be reproduced within the virtual world in like sizes, proportions, relative positions, and arrangements as in the real world. For example, an exemplary 3D virtual model of New York City would in fact resemble New York City in many respects, with matching general geography and landmarks. Within the virtual world, virtual objects may be created (e.g., instantiated) at virtual locations. Since a virtual location corresponds with a real world location, a virtual object at a given virtual location becomes associated with a particular real world location that corresponds with the given virtual location. Data stored by or with the virtual object is also inherently associated with the particular real world location. In some cases a single virtual object may be added as means for storing information for more than one location.

At block 201, a camera captures one or more real world images and/or videos. Static images may be, for example, individual photographs. Videos may comprise frames of a video.

At block 202, a location and orientation of the camera is sensed concurrently or substantially concurrently with the capturing at block 201. Pose may be sensed at block 202, where pose comprises both orientation and position. Location may be expressed in different forms for different embodiments, but an exemplary expression of location is with latitude and longitude coordinates.

At block 203, the sensed parameters of the camera are permanently associated with the real world image(s) or video(s) captured at block 201. For example, the images captured at block 201 may have embedded therewith the sensed camera parameters of block 202. Location, pose, orientation, and position are all exemplary metadata associated with the real world image or video content. Additional or alternative metadata may be involved in some embodiments.

At block 204, the camera parameters associated with the image or video such as latitude, longitude, and orientation are used to determine a region of a virtual model which is "visible" within a frame of a captured static image/video. Virtual objects in the virtual model which are visible within the viewing frustum of the captured image or video are candidates for augmentation.

At block 205, augmentations are produced based on a selection of the virtual object candidates. The augmentations serve as virtual content that may be overlaid on and/or otherwise added to the image or video. As used herein, "augmented reality (AR) content" may refer to media that contains both real world content as well as virtual augmentations, that is to say virtual content that has been added consistent with augmented reality methods. Depending on the output device, AR content may comprise just augmentations. For instance, on a see-through head mounted display (HMD), the real world is naturally visible to a user through a see-through display surface of the device. Therefore a see-through HMD need only actively display augmentations in order to provide AR content. Real world content is provided but is, in essence, provided passively.

The determination of what AR content to serve to specific users may depend on one or more of a variety of metadata associated with real world content. Besides the camera location and orientation information in the preceding description, metadata may include criteria of an end user that must be met prior to a system or method providing that end user with particular AR content. In general, in some embodiments one or more processors may be configured to receive user criteria (e.g., credentials, subscriptions, etc.), determine the AR content to be served to that user by comparing the user criteria with the image or video metadata, and selecting augmentations based on the comparison. When performing this process for multiple users with different credentials, the result may be the provision of AR content that differs for different respective end users. Thus, while identical real world image or video content may be augmented, the augmentations supplied and output (e.g., step 205 of FIG. 2) may differ substantially. End user criteria may include, for example, authentication credentials or subscriptions to particular types or channels of AR content.

As an illustrative example, say Abigail (User A) captures a video at the foot of a mountain during the fall season. The location of the camera capturing the video and time of year at which the video is captured are associated with the video as metadata. The video and metadata alike may be stored for any duration of time or put to use immediately. Bobby (End User B) and Charlie (End User C) are both to be provided an augmented reality based on Abigail's real world video. However, Bobby has a criteria set which specifies his desire for summer themed augmentations (say because Bobby likes summer wildlife observation.) Charlie, on the other hand, has a criteria set which specifics his desire for winter themed augmentations (say because Charlie likes snowboarding.) When Abigail's video is processed for each respective user, different augmentations are selected for output despite the same base real world content being used in all cases. The location metadata of Abigail's video matches with Bobby's summer criteria to result in AR content including virtual wildlife like birds known to roost on that particular mountain in summers. In Charlie's case, the location metadata of Abigail's video matches with Charlie's winter criteria to result in AR content including a carpet of snow typical on that particular mountain in wintertime. Same real world base content to start, but different augmentations output in the end.

As another illustrative example, consider real world content comprising images or video of an outdoors wilderness space. To a first user who is a hiker, AR content of relevance may be virtual markers which mark a trail path, or virtual annotations providing historical relevance or identifying scenic overlooks. To a second user who is geologist, different AR content may be relevant. For such a second user the AR content may comprise virtual shading based on rock striations, for example. To a third user who is an archaeologist, relevant AR content may comprise virtual highlighting or demarcations identifying potential fossil records. For all three example users, the real world content may be the same or substantially the same despite the virtual content differing. Note that in each of these cases, the relevant AR content may be created by the associated user and/or consumed by the associated user.

As another illustrative example, a video of a politician may have associated therewith metadata indicative that the content of the video shows a person of a particular political party (e.g., Republican or Democrat). When processing the original real world video to generate AR content, an end user's political party may be used as a criterion against which the metadata is compared and used to determine which augmentations to select and provide in the output. Thus, two different end users, one Democrat and one Republican, may be provided different AR content depending on whether the end user is of the same party as the politician featured in the video or of a different party as the politician featured in the video.

AR content may be dynamic, varying with time based on factors which themselves may vary with time. In determining what AR content to supply in a given case, an exemplary embodiment may entail time synchronization of the AR content with the real world content being augmented. As an illustrative example, consider real world content which comprises video footage of a mountain road. It is desired that AR content comprise a (virtual) vehicle moving along the road, but to achieve this effect a number of factors may be synchronized using time. For example, one factor may be the presence versus absence of a vehicle on the road, and in particular at different locations on the road, at different times. The AR content may be carefully timed to portray certain aspects of apparent movement of VR content, such as the speed of a vehicle. Another factor is the visual characteristics of the vehicle, which must not only be applied at the correct locations visible within the real world content at the right times, but also coordinated as to the user. A different type of vehicle may be shown for different users, for example. AR content may be determined based on a time or times when the real world content was originally captured, e.g., what quantitative or qualitative time of day (e.g., morning, noon, afternoon, evening, dusk, etc.) is descriptive for the real world content. For example, the lighting (e.g., shadows, shading, etc.) of the vehicle may also need be time synchronized to correspond with a time of day in the real world content, thereby improving the semantic context of the virtual with the real, the realism with which the virtual content is integrated with the real content.

AR content produced for a user may also be dependent on time factors concerning the consumption (e.g., viewing) of the AR content. As an illustrative example, an image or video (real world content) is captured on February 22. When this real world content is reproduced on July 4, virtual content comprising fireworks may be provided as augmentations. On Halloween, virtual content comprising ghosts may be provided as augmentations. The AR content may be timestamped or otherwise associated with particular time As used herein, "time" may refer to a day of the week, a calendar day, a clocktime (e.g., identified by the hour or by hours and minutes per a 12 hour or 24 clock), a general time of day (e.g., morning, afternoon, evening, night), a holiday, a season (e.g., fall, winter, summer, spring), a time zone, a year, a decade, a century, some combination of these, and/or some other commonly understood characterization of time.

Metadata that tracks sharing history may also be used to determine what AR content to provide to specific end users. For example, when real world content is shared by User A, metadata may be associated with that content indicative that it has been shared by User A. Thus, the AR content provided to User B may be determined partially or entirely on the basis that it was User A (and not, say, a User C) that shared the base content. Metadata that is used to determine AR content to serve particular end users may include but is not limited to the identify (or identities) of one or more senders, of one or more recipients, of one or more contacts (e.g., in a social network), and others.

"User" herein generally means an entity that uses a part or a whole of the invention. "End user" herein is generally a subset of "user" and implies the entity actually consumes some output of an embodiment, in particular an augmented reality output. Often consumption comprises viewing, but it may also or alternatively involve hearing, feeling, tasting, or smelling (the latter two being uncommon forms of consuming AR at the time of the invention but within the scope of possible AR consumption contemplated by the invention). "User" may refer to a human interacting with or using an embodiment of the invention. A user may be a group or classification of multiple users. A user or users may be characterized according to any of a number of characteristics. For example, a user may be characterized by a classification, a type, an age, an access level, a demographic, a status, a customer status, a profession, or some other quality. A user may be a person, a thing, a computer, a software program, an artificial intelligence, a work group, a company, a corporate division, a maintenance crew, a content creator (e.g., a user that captures real world content, or a user that creates virtual content), a content consumer, a content editor, a programmer, a subscriber, and/or some other entity. The expression "per user basis" may be used in reference to any such user listed here or some other user not listed here but meeting the definition of "user" herein provided.

Figure 3:
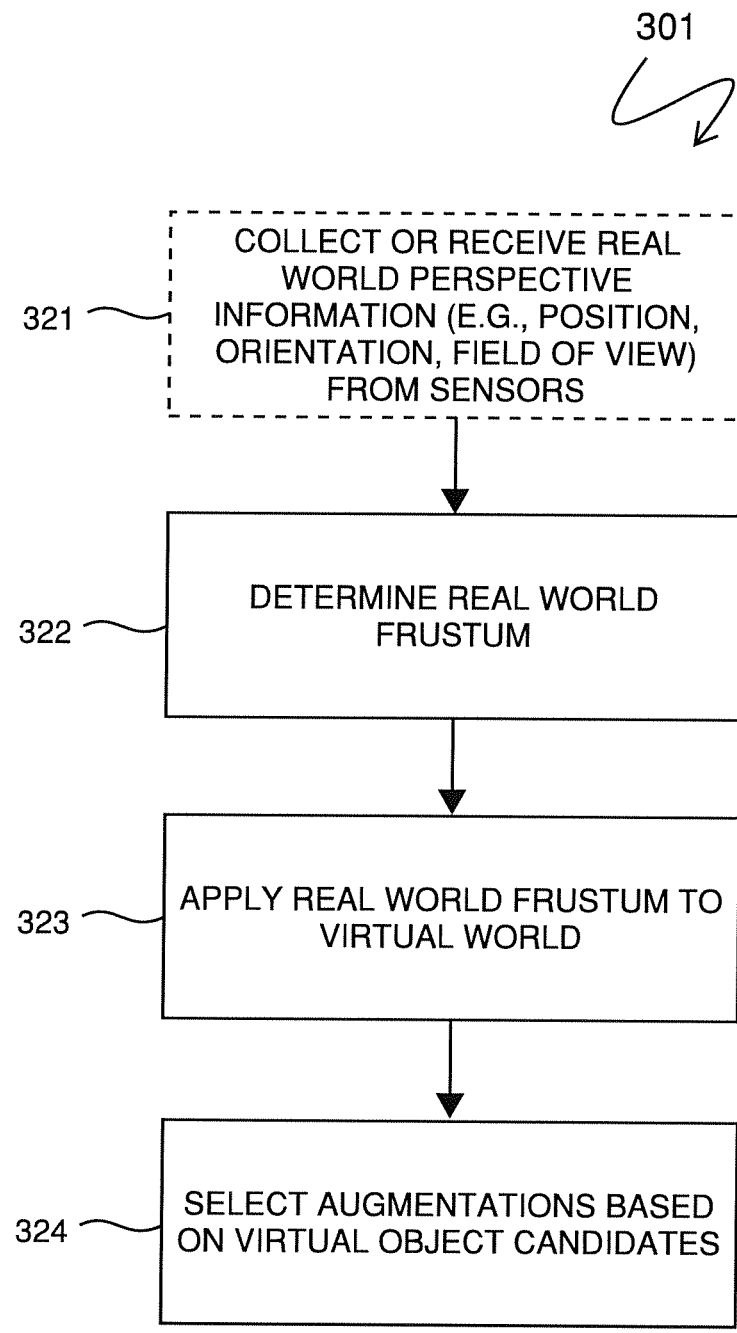
FIG. 3 is a subprocess for selection of virtual objects and augmentations for use as AR content.

FIG. 3 shows exemplary sub-steps usable within block 154 (FIG. 1) or blocks 204/205 (FIG. 2). Perspective information characterizing the real world content of the image or video to be augmented may be collected or simply received at block 321. Generally, a GPS sensor, digital compass, and gyroscopic sensors, for example, may be used to collect the 3D position and orientation of a camera co-located with such sensors. At block 322, a 3D real world frustum is determined based on the 3D position and orientation of the camera, and on assumptions about the near and far field limits. These limits may be set to default values, for example. At block 323, the real world frustum is applied to the virtual world and thus determines which virtual objects are candidates for augmentation into the original camera images. Virtual objects which are in the viewing frustum may be viable candidates, whereas virtual objects outside the viewing frustum may not. At block 324, selection is made of augmentations based on the virtual object candidates. Augmentations are the actual virtual content added to real world content and which may be consumed by a user viewing the AR output. The selection at block 324 may involve one or more criteria including, for example, user option selections and the relationships between different virtual objects. For instance, one or more processors may determine which of the virtual objects obscure parts of each other based on the frustum in the virtual world. The final augmentations may then be applied to the image or frame containing real world content and output, e.g., at block 154 of FIG. 1 or block 205 of FIG. 2. The process 301 according to some embodiments may involve little or no image processing whatsoever. In some cases image processing may also be used, however.

The virtual world containing and storing the virtual objects which are employed for generating AR content may be a 3D virtual representation of the real world which may be stored as data in one or more databases (e.g., a central database or a distributed network). Such databases or networks may store, for example, geometric aspects of the virtual representations and characteristics of the objects which are instantiated within that virtual representation.

In some embodiments, one or more processors (e.g., of the device or system that includes the initial camera, or of an AR engine or AR-enabled device) are configured to use some combination of some or all of the following to determine which virtual objects should be provided (e.g., shown or otherwise output) as augmentations: digital compass input from a magnetic sensor; rotational data from a gyroscopic sensor; acceleration data from linear acceleration sensors; GPS data (latitude, longitude, altitude, and geodetic datum) from a GPS sensor; or image data from a video stream (which may itself include augmentations from other AR systems). The processing of this information is used to determine the real world viewing device's (e.g., camera's) position, orientation, and field of view (expressed as a frustum), and to estimate an accuracy of that determination. For example, the one or more processors may determine a viewing device's (e.g., camera's) six-dimensional location. Location may be the set of latitude, longitude, altitude, geodetic datum, and orientation, or include some combination of these. Orientation may be determined as a combination of angles, such as a horizontal angle and a vertical angle. Alternatively, orientation may be determined according to rotations, such as pitch, roll, and yaw.

GPS data along with digital compass and gyroscopic sensor data may be used at a given moment to determine the 3D location and orientation of a camera that is co-located with the relevant sensors. The resulting real world frustum may then be applied to a 3D virtual representation (a virtual world). Corrective algorithms may be used during or after the applying step 323. For instance, if a putative augmentation is not be exactly positioned on or adjacent to an object which appears in the real world content, a procedure may be executed which "snaps" the augmentation to the nearest object detected in the image.

Based on the real world viewing device's (e.g., camera's) frustum, and on the detected placement of any relevant image data in the image, augmentations may be displayed as sourced from the 3D virtual representation (a virtual world), as modified by characteristics associated with that representation, and potentially adjusted due to detected image data. Augmentations may be visual and/or may be audial or tactile, for example.

Field of view (FOV) is the extent of the observable world seen at a given moment, e.g., by a person or by a camera. In photography, the term angle of view (AOV) is more common but can be used interchangeably with the term field of view (FOV).

Angle of view is one significant camera configuration. A camera is only able to capture an image or video (e.g., a series of images) containing an object if that object is within the angle of view of the camera. Because camera lenses are typically round, the angle of view of a lens can typically be expressed as a single angle measure which will be same regardless of whether the angle is measured horizontally, vertically, or diagonally. Angle of view of a camera, however, is also limited by the sensor which crops the image transmitted by the lens. The angle of view of a camera may be given horizontally, vertically, and/or diagonally. If only a single value is given with respect to a camera's FOV, it may refer to a horizontal angle of view.

Angle of view is related to focal length. Smaller focal lengths allow wider angles of view. Conversely, larger focal lengths result in narrower angles of view. For a 35 mm format system, an 8 mm focal length may correspond with an AOV of 180°, while a 400 mm focal length corresponds with an AOV of 5°, for example. As an example between these two extremes, a 35 mm focal length corresponds with an AOV of 68°. Unaided vision of a human tends to have an AOV of about 45°. "Normal" lenses are intended to replicate the qualities of natural vision and therefore also tend to have an AOV of about 45°.

Angle of view is also dependent on sensor size. Sensor size and angle of view are positively correlated. A larger sensor size means a larger angle of view. A smaller sensor size means a smaller angle of view. For a normal lens, FOV (or AOV) can be calculated as $$FOV = \tan^{-1}\left(\frac{d}{2f}\right)$$

where d is the sensor size and f is the focal length.

Figure 11:
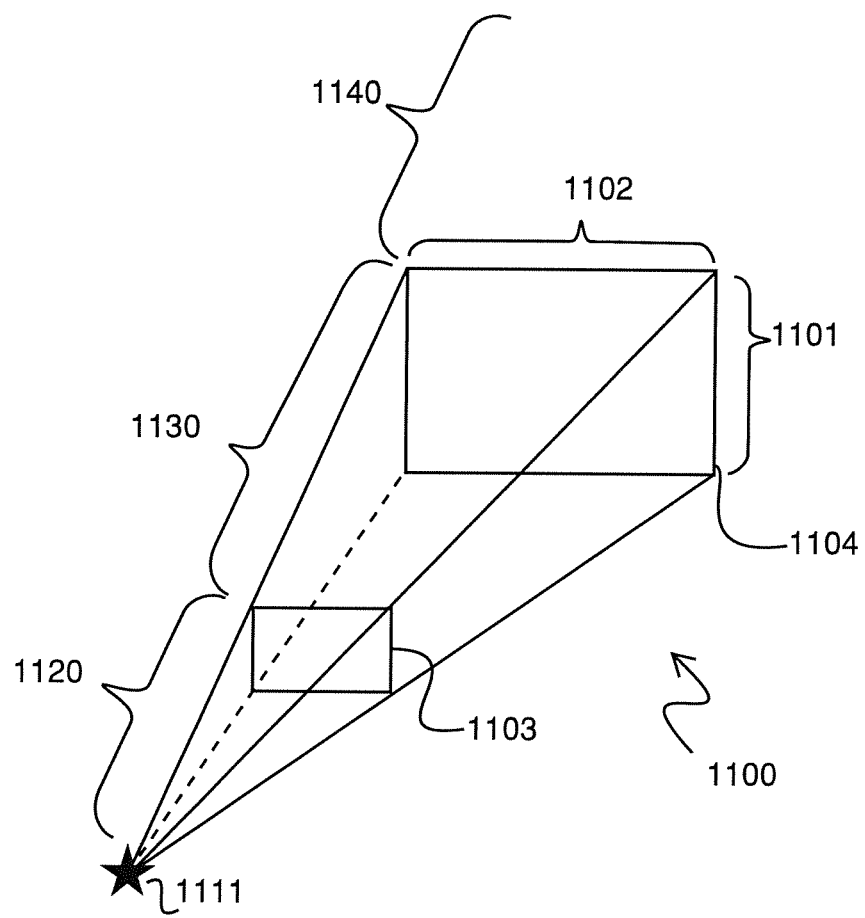
FIG. 11 shows a frustum.

"Frustum" may be used to refer to a visible region of three-dimensional space. A real world setting may involve a camera, whereas a virtual world setting may involve a viewpoint (e.g., a virtual camera). In the context of digital spaces (e.g., virtual reality worlds), field of view (FOV) is frequently discussed according to a viewing frustum. FIG. 11 shows an example of a viewing frustum 1100, referred to herein simply as "frustum." Because viewports are frequently rectangular, the frustum is often a truncated four-sided (e.g., rectangular) pyramid. For viewports of other shapes (e.g., circular), the frustum may have a different base shape (e.g., a cone). The boundaries or edges of a frustum 1100 may be defined according to a vertical field of view 1101 (an angle, usually expressed in degrees), a horizontal field of view (an angle, usually expressed in degrees), a near limit (a distance or position), and a far limit (a distance or position). The near limit is given by a near clip plane 1103 of the frustum. Similarly, the far limit is given by a far clip plane 1104 of the frustum. Besides these boundaries, a frustum may also include position and orientation. In short, an exemplary frustum may include position, orientation, field of view (horizontal, vertical, and/or diagonal), and near and far limits. In a digital space, virtual objects falling in the region 1120 between the viewpoint 1111 and the near clip plane 1103 may not be displayed. Likewise, virtual objects falling in the region 1140 which are beyond the far clip plane 1104 may not displayed. Only virtual objects within the frustum 1100, that is to say within the region between the near and far clip planes 1103 and 1104 and within the horizontal FOV 1102 and vertical FOV 1101, may be candidates for representation by augmentation. This differs from a real world view of a camera, where visibility of an object is generally based on horizontal FOV 1102 and vertical FOV 1101 only. That is to say, for a camera in a real world setting, real objects which are within the horizontal FOV 1102 and vertical FOV 1101 are generally visible. In a digital space, a near clip plane 1103 may be set to zero (i.e., at the viewpoint) and a far clip plane 1104 may be set to infinity or substantially infinite distance in order to approximate the view from a camera looking upon the real world. However, omission of objects closer than a virtual camera's near clipping plane (which would ordinarily be out of focus for a real camera), and of objects beyond its far clipping plane (which would for a real camera appear so tiny as to be effectively invisible unless their physical dimensions are quite large) is performed as an efficiency gain in a virtual system. A virtual camera's near clipping plane may be placed arbitrarily close, and the far clipping plane arbitrarily far, if an augmented reality system is willing to do the extra processing required to render the resulting increased volume of the frustum. In any case a frustum may generally correspond with a real camera's field of view. It should be understood that obstruction of one object by another as well as object diminution at great camera-to-object (viewpoint-to-object) distances may result in reducing or eliminating visibility of an object even though it technically exists within a frustum 1100.

The need for a correctly matched perspective between virtual and real worlds means that in order to provide an accurate spatial relationship between virtual objects and real objects in an augmented reality output, it is necessary to determine the field of view of the real camera so that the virtual field of view can be matched to the real field of view.

In order to create a visual augmented reality system, in addition to establishing spatial relationships between virtual objects and real objects, the visual perspective into the real world must be matched to the effective visual perspective into the virtual world. Even when the virtual world objects are sized and positioned correctly with respect to their real world counterparts, the determination of which virtual objects are eligible for visual presentation to the user depends on the perspective in the virtual world, which must be matched to the real world perspective of a real world camera in order to take advantage of carefully determined spatial relationships among virtual and real objects. The perspective of the camera may include the position of the camera, the orientation of the camera, and its field of view.

The one or more processors involved with the subprocess illustrated by FIG. 3 may conduct processing that determines which augmentations should be added to a specific real world view, and as a corollary what augmentations should not be added to that view. There are multiple aspects of a real world view that may affect such a determination. A first aspect is the relationship between the viewing device (e.g., a camera) and an "object" of interest. The spatial relationship between the two objects may involve one or more of a topological relation, a distance relation, and a directional relation. A topological relation between an object A and an object B may be, for example, A is within B, A is touching B, A is crossing B, A is overlapping B, or A is adjacent to B. Precise spatial relationships between real and virtual objects allow an augmented reality system to generate perceptual experiences in which real and virtual objects are apparently combined seamlessly, e.g. for visual systems the combined presentation is apparently in the correct visual proportions, perspectives, and arrangement. Virtual content that has been combined with real world content in this manner may be characterized as being in semantic context with the real world objects or real world view.

It should be appreciated that augmentations that are or include auditory and tactile elements still involve virtual objects that need to be identified with accurate spatial relationships with respect to real world objects. For example, a VR device that is an HMD may be used to give a guided tour of a real place like New York City. When a user looks at the Empire State Building with the HMD, the device may announce through a speaker "You are looking at the Empire State Building." This announcement is an auditory augmentation corresponding with a virtual object that has a location in the virtual world which matches the location of the actual Empire State Building in the real world. Without a determination of the field of the view of the VR device (more specifically the FOV of its camera or cameras), the device conceivably could announce to a user that the Empire State Building is visible when in fact it is just outside of the actual field of view.

In embodiments of the invention, processing steps such as processing steps which appear in FIG. 1, 2, or 3 may be configured as a greater or fewer number of steps compared to those which are shown. The exemplary methods shown may also be performed or organized with further substeps.

Image processing is conducted is some exemplary embodiments using a convolutional neural network. A convolutional neural network comprises computer-implemented neurons that have learnable weights and biases. A convolutional neural network employs a plurality of layers and combines information from across an image to detect an object in the image. Various image recognition techniques may be employed, some of which employ a convolutional neural network. Examples are targeting, windowing, and classification with a decision tree of classifiers.

In FIG. 2, in particular at block 205, and in FIG. 3, in particular at block 324, an augmentation may involve one or more (i.e., at least one) sensory modality. Sensory modalities may be visual, audial, tactile or haptic (e.g., vibration), or olfactory, or any combination thereof, e.g., audiovisual. Augmentations may take the form of 3D representations of real objects (e.g., a detailed 3D representation of a cell tower), or of abstractions of real objects (e.g., a cell tower represented as a simple cylinder with a sphere at the top), or of indicators or cues (e.g., callout boxes). Some information represented in an augmentation may have no corresponding real world shape. For example, a wireless network link between two wireless network antennas has no real world visible representation, so any augmented presentation of that connection is necessarily some kind of abstraction (e.g., a geometric shape). On the other hand some information represented in an augmentation may have at least one straightforward augmentation that is minimally abstract, e.g., a 3D graphic of a building that is positioned, shaped and colored to be very much like a corresponding real building.

Virtual objects of a virtual world may be stored and manipulated as data within one or more databases. The virtual objects may have their own existence separate from how they are displayed, visualized, haptically buzzed, or otherwise output by an output device. So, generally speaking, a virtual object has its own characteristics, and then, based on those characteristics and on the real and the virtual environment, an exemplary augmented reality system determines what is presented to the user. If a given virtual object is obscured, then it may not be presented to the user as an augmentation. On the other hand, if the system determines that a given virtual object should be visible to the user given the viewing device's position and orientation in the real world and therefore its position and orientation in the virtual world, an augmentation may be displayed (or otherwise provided).

An augmentation may correspond with a virtual object that has a specific location in a virtual world. The virtual world is characterized by a number of locations which correspond with real locations which appear in an image or frame of the real world. In essence, a virtual world (e.g., a virtual model of the real world) is populated with virtual objects corresponding with either or both seen real world objects and unseen qualities of the real world (e.g., data connection paths between cell towers of a mobile network). A virtual world view is characterizable with a frustum. A frustum includes position, orientation, filed of view, and near and far limits of the field of view. A real world view is similarly characterizable, except that in a real world view there is technically no hard limit on near and far limits of field of view.

As a concrete example, an image of a real world view (i.e., a real world image) may include within its field of view a building with a typical rectangular shape. The building has a particular GPS location. More specifically, each of the four corners of the building that touch the ground has its own GPS coordinates. In a corresponding virtual world, a virtual object in the form of a rectangular prism may exist at coordinates which align with the real world GPS coordinates. The virtual object (in this case the rectangular prism) if displayed in an augmented reality would align with the real building in any augmented view so that the two objects—the real world object and the virtual object, align, one superimposed on the other.

Figure 4:
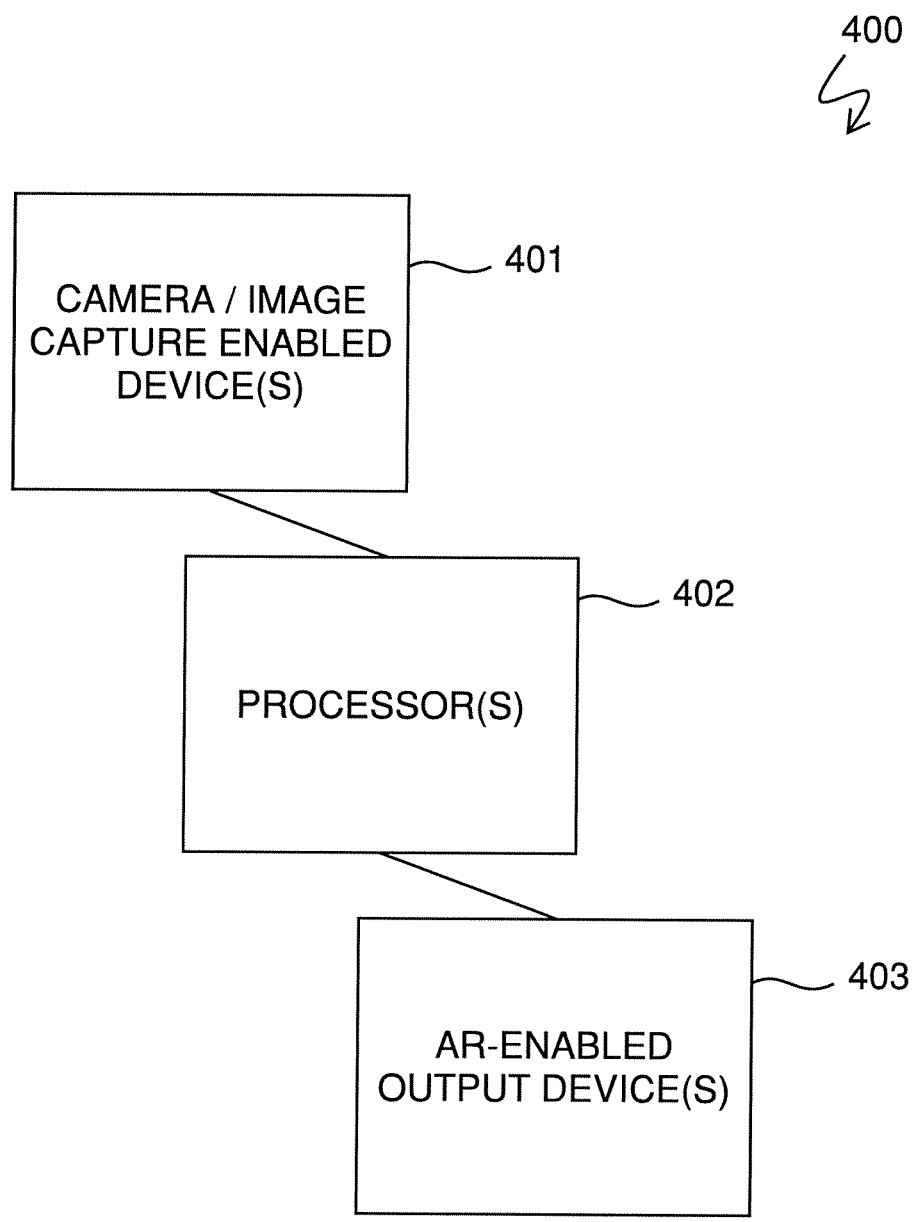
FIG. 4 is a block diagram of an exemplary system.

Some augmentations are or include a solid 3D model rendered within the context of the real world image. Some augmentations are subject to be changed or replaced or substituted entirely over time. Some augmentations are animations superimposed on the real world image. For example, an augmentation may be a scaled 3D model or animation that is played based on some event. Animations may be triggered (e.g., macroed) based on such an event. FIG. 4 shows an exemplary system 400 for performing methods such as the exemplary methods 150, 200, and 301 of FIGS. 1, 2, and 3, respectively. An exemplary system 400 comprises at least one camera 401, one or more AR-enabled output devices 403, and one or more processors 402 configured to execute computer-readable program instructions which, when executed by the processors, cause the processors to perform data processing steps such as those of methods 150, 200, and 301. Cameras may be standalone devices or components within multifunction devices which are image capture enabled (e.g., smartphones, tablets, computers, etc.). One or more of the elements 401, 402, and 403 may be components to the same device or physically independent of one another.

Figure 5:
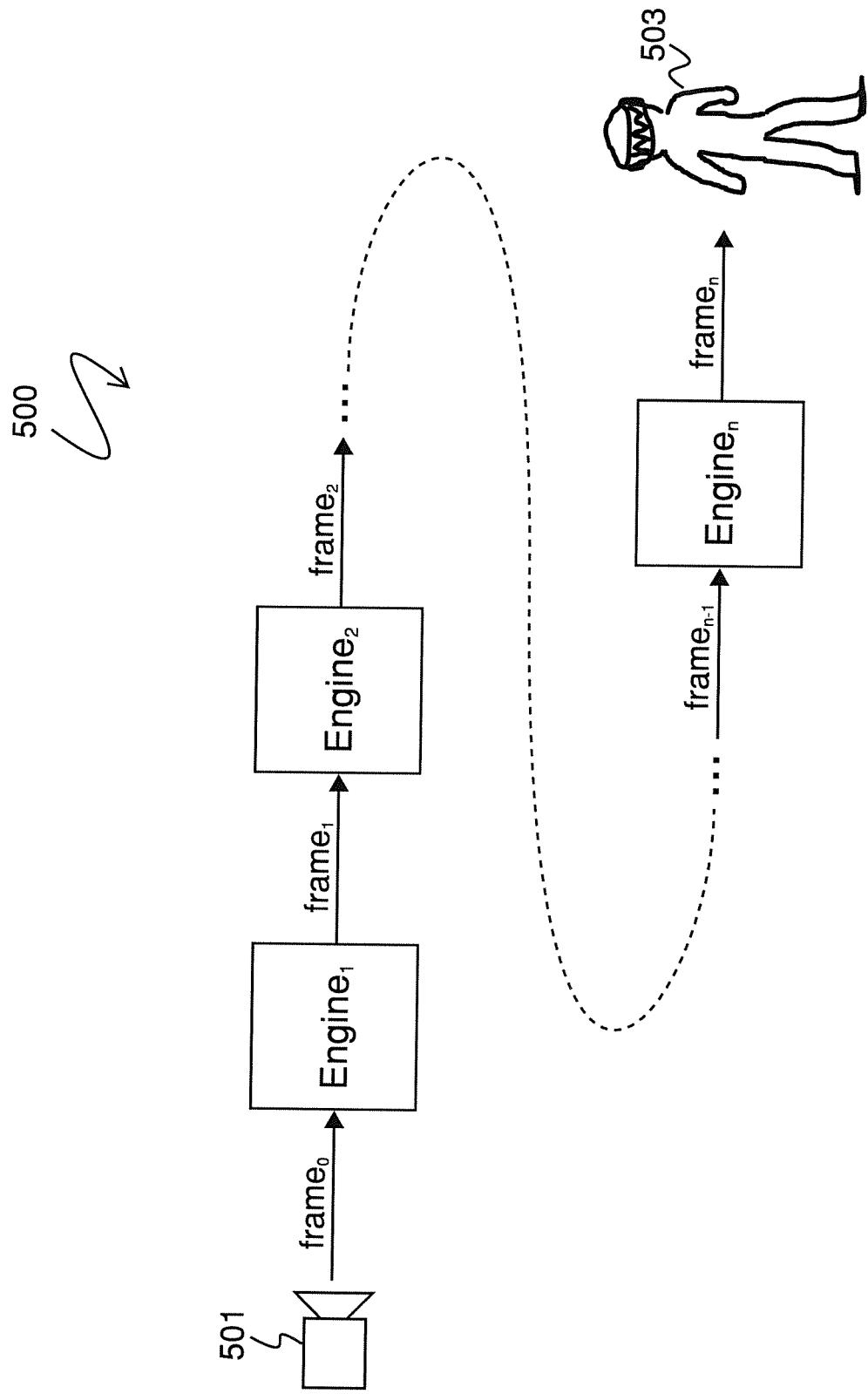
FIG. 5 is a block diagram showing an example of informational flow through an AR system.

FIG. 5 is a block diagram showing an exemplary progression of information or data among elements which may contribute to the production of AR. The AR system 500 comprises a plurality of AR engines, each distinguished in FIG. 5 by subscript. An AR engine may be or comprise a processor or processors. An AR engine may be or comprise an AR-enabled device. Generally, a plurality of AR engines may comprise at least one upstream AR engine and at least one downstream AR engine. The AR system 500, as its name implies, is configured to produce an augmented reality (AR) or contribute to the production of AR which is ultimately supplied to one or more end users 503. At a front end of the system 500, an input is required in order for the system to acquire an "understanding" of whatever real world surroundings exist so that virtual content may be placed in semantic context with the real world. Semantic context may be environmental, e.g., concerning objects or landmarks in the vicinity of the AR view. Semantic context may be geographic, e.g., concerning the geographic location of the AR view. A suitable input is an image or frame (i.e., a video frame) from a camera 501. In general, a video comprising many video frames may be input to such a system. Other inputs and additional inputs are possible, but for the clarity of discussion the embodiment of FIG. 5 will use a frame.

$Frame_0$ is an output of the camera 501, and $frame_0$ is an input to $Engine_1$. $Frame_0$ is strictly real world content (i.e., it does not contain virtual content). The real world content may include image data. The real world content may include metadata like GPS coordinates, time of capture information (e.g., time stamps), perspective data (e.g., orientation, position, field of view), and/or other data describing real world objects, conditions, or circumstances. $Frame_0$ undergoes a series of modifications as it's processed by AR system 500. FIG. 5 shows stages of modifications to the original real world content of $frame_0$ by iterating the subscript number of the frame. Accordingly, $frame_1$ is a modified version of $frame_0$, $frame_2$ is a modified version of $frame_1$, and so on and so forth. The $n^{th}$ AR engine modifies $frame_{n-1}$ such that $frame_n$ is a modified version of $frame_{n-1}$. The variable "n" may be any whole number. The number of AR engines involved in transforming the initial real world content, $frame_0$, to a final AR output, $frame_n$, may be as few as one and as many as may be desired or necessary according to a given embodiment (1, 2-10, 10-50, 50-100, 100-500, or more).

In the AR system 500, each respective AR engine may be responsible for one, multiple (e.g., a series), of the steps illustrated and described in connection with FIGS. 1, 2, and 3. For instance, a particular AR engine may be configured to perform one or both of the associating steps (blocks 152 and 153) of method 150. The same or different AR engine may perform the selection and addition of specific pre-determined AR content. The AR content may be one or more of visual, audial, and tactile.

Figure 6:
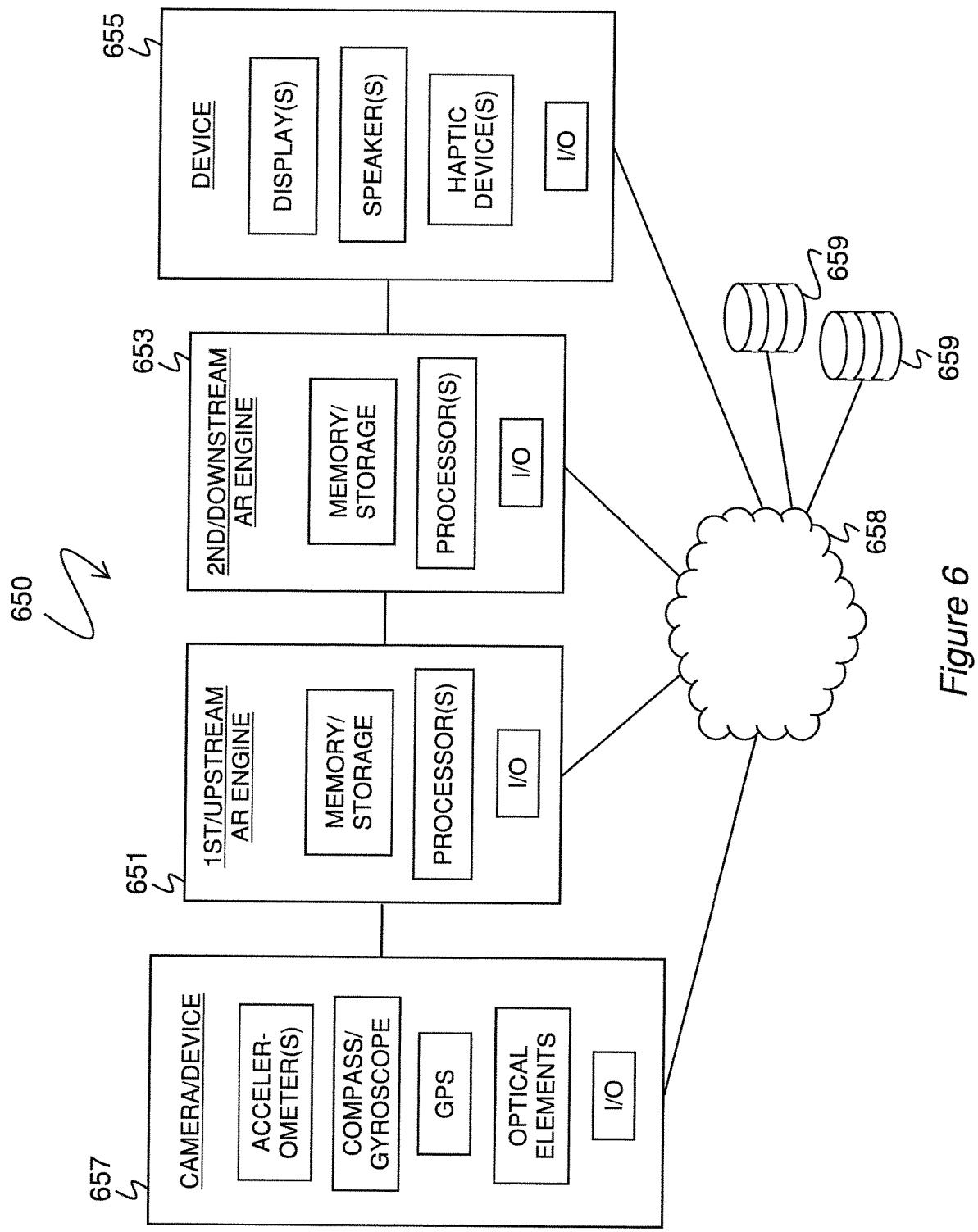
FIG. 6 is a block diagram of different elements and subelements within an exemplary AR system.

FIG. 6 is a block diagram of a system 650 for producing an augmented reality (AR). The system 650 comprises a plurality of AR engines (651, 653, etc.), one or more output devices 655, and one or more cameras 657 (which may be part of some multifunction device having capabilities besides photography/videography). AR Engines 651, 653, etc. are apparatuses configured to provide or produce or contribute to the production of augmented reality content.

An exemplary AR engine takes as input a still image or still images, or a video or video frames, and outputs augmented reality content.

AR Engines and AR-enabled devices may take a variety of forms with varying amounts of hardware versus software. Some commercial examples of AR engines embodied as AR headsets are Microsoft HoloLens, Sony SmartEyeglass, Google Glass, and Vuzix M100 Smart Glasses. Some AR engines may be embodied as virtual reality (VR) headsets. Commercially available examples include Oculus Rift, HTC Vive, and Sony PlayStation VR (Project Morpheus). In the case of VR headsets, AR may be produced by displaying a real world camera's feed to a user as the base image. AR engines may be embodied simply in software. For instance, the software which supports Microsoft HoloLens may be characterized as an AR engine, independent of the physical headset a user must wear to experience the output of the AR engine. Electronic devices like smartphones, personal computers, and servers (both general purpose as well as special purpose) may also be configured as AR engines.

In some embodiments, an exemplary input device 657 comprises, at a minimum, means for capturing information about real world surroundings. Generally the means for capturing information is an optical device, more specifically a camera. The type and number of cameras may vary among embodiments, including visible-light sensitive cameras and night vision (infrared) cameras, among others. Other data besides visual data may be collected to describe real world surroundings. For instance, embodiments may comprise additional sensors such as but not limited to any combination of the some or all of the following: accelerometer(s), location sensor(s) (e.g., GPS modules), gyroscope(s), magnetic field sensor(s) or magnetometer(s), proximity sensor(s), barometer(s), thermometer(s), and microphone(s). The sensors collect the type of data of their respective types (e.g., magnetometer collects magnetic field data or compass data, microphone collects audio data, etc.).

Based images/videos captured at some time in the past, previously modified or augmented images/videos, virtual worlds, and/or virtual objects thereof may be stored in individual AR engines 651, 653, etc. and/or in remote databases 659 and/or according to a distributed network of storage resources (e.g., peer-to-peer systems).

FIG. 6 shows physical interconnections as well as connections over a network 658 such as the Internet. Individual embodiments may involve hardware connections, networked connections, or some combination thereof. While FIG. 6 shows system 650 implemented according to several interconnected hardware components, the precise hardware configuration may vary among embodiments. For instance, the camera 657, first AR engine 651, second AR engine 653, $n^{th}$ AR engine, and output device(s) 655 may all be comprised by one unitary device. One or more AR engines may be implemented as software, in which case the functionalities described herein with respect to the AR engines may be configured as instructions on a (non-transitory) computer-readable medium that, when executed by one or more processors, cause the processors to perform one or more of the methods in accordance with what is described herein and illustrated in the figures.

FIGS. 7-10 illustrate an exemplary progression of a real world image as it is augmented in accordance with exemplary embodiments described herein.

Figure 7:
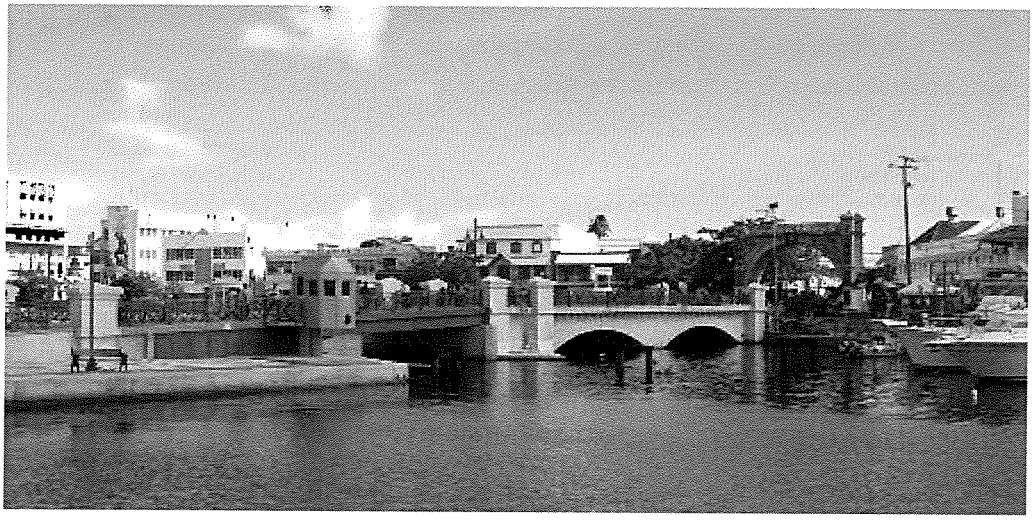
FIG. 7 is an original/base image containing real world content.

FIG. 7 is an original/base R-snap image 700 which may be captured at block 201 of method 200 of FIG. 2, for example. At this stage, the image 700 shows only real world content. In this example the real world content includes a bridge, a waterway, sky, several buildings in the background, and the bows of two boats on the right hand side. At the time image 700 is captured, both location and orientation information are collected for the camera capturing the image 700. The location and orientation information are permanently associated with the image 700. For example, the location and orientation information may be embedded as metadata.

Figure 8:
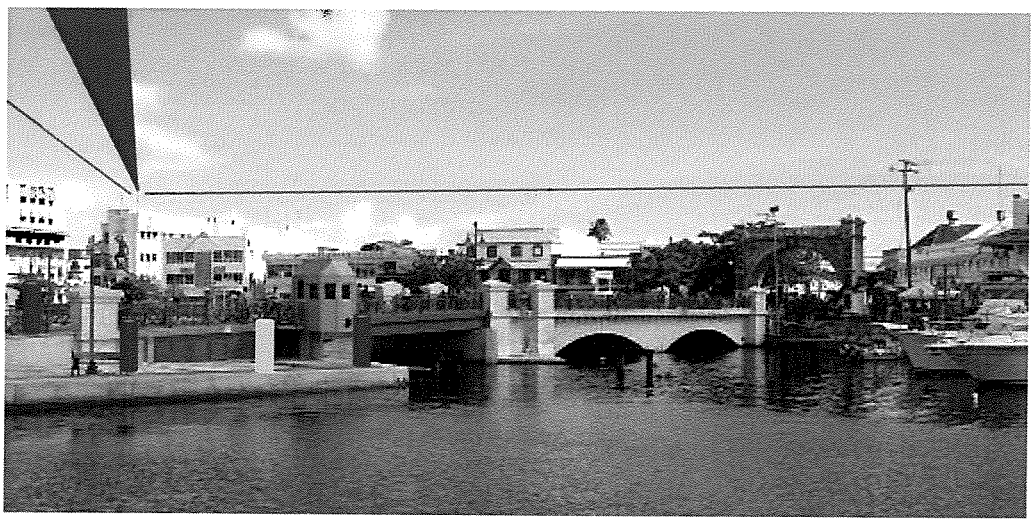
FIG. 8 is an augmented reality (AR) output comprising an original image together with a first AR overlay.
Figure 9:
FIG. 9 is another AR output comprising an original image together with a second AR overlay.
Figure 10:
FIG. 10 is another AR output comprising an original image and the combined overlays of both FIG. 8 and FIG. 9.

FIGS. 8, 9, and 10 shows various augmented reality (AR) outputs based on image 700 from FIG. 7. Each visual content output contains real world image content as well as one or more overlays comprising augmentations based on virtual objects. In FIG. 8, the AR output 800 includes pole-like markers to the left side of the waterway as well as lines crossing the sky as they trace wireless connection paths from a single real world antenna. The virtual lines representing connection paths are in semantic context with the real world antenna. The AR output 900 of FIG. 9 shows a different overlay, this time with augmentations that include toys afloat in the waterway, ring buoys on the bridge, and a bird in flight at top left corner of the frame.

An advantage of the permanent association of metadata like location and orientation information with the base image is the ability for separate users to rely on the same base image(s) and/or video(s) for use with different augmentations (e.g., overlays). Different recipients of the base image(s) and/or video(s) may be subscribed to different AR content, as exemplified above in connection with the mountain video example. The different AR content can be appropriately applied to the base image/video in reliance on the metadata (e.g., the associated camera parameters like location, orientation, and position). Different recipients of the base image/video with different subscribed AR content may result in different AR overlays to the base image, as illustrated by a comparison of FIG. 8 and FIG. 9.

FIG. 10 shows an AR output 1000 which includes a plurality of overlays. A user receiving AR output 1000 is subscribed to the same AR content as used for each of AR outputs 800 (FIG. 8) and 900 (FIG. 9).

As used herein, "augmented reality", or "AR", is a direct or indirect experience of a physical, real-world environment in which one or more elements are augmented by computer-generated sensory output such as but not limited to sound, video, graphics, or haptic feedback. Augmented reality is frequently but not necessarily live/in substantially real time. It is related to a more general concept called "mediated reality", in which a view of reality is modified (e.g., diminished or augmented) by a computer. The general intent is to enhance one's natural perception of reality (e.g., as perceived by their senses without external devices). In contrast to mediated reality, "virtual reality" replaces the real world with a simulated one.

Augmentation is often but not always in real-time. It is desirable that augmentations be in semantic context with environmental elements. For example, many Americans are accustomed to augmented reality when watching American football on a television. A football game as captured by video cameras is a real world view. However, the broadcasting company frequently augments the recorded image of the real world view with the line of scrimmage and first down markers on the field. The line and markers do not exist in reality, but rather they are virtual augmentations that are added to the real world view. As another example, in televised Olympic races, moving virtual lines can be superimposed on tracks and swimming pools to represent the position of a runner or swimmer keeping pace with the world record in the event. Augmented reality that is not in in real-time can be, for example, superimposing the line of scrimmage over the image of a football match that is being displayed after the match has already taken place. Augmented reality permits otherwise imperceptible information about the environment and its objects to supplement (e.g., be overlaid on) a view or image of the real world.

Augmented reality differs from a heads-up display, or HUD. A HUD displays virtual objects overlaid onto a view of the real world, but the virtual objects are not associated visually with elements of that real world view. The virtual objects are not in semantic context with real world surroundings. Instead, the HUD objects are associated with the physical device that is used to display the HUD, such as a reflective window or a smartphone. A HUD moves with the display and not with the real world view. As a result, the virtual objects of the HUD are not perceived as being integrated into the real world view. When a display pans left, for example, a HUD moves left with the display. In contrast, augmentations (of an augmented reality) would move right with the real world view. Embodiments of the invention are primarily concerned with augmented reality as opposed to HUDs, although HUDs may be used in conjunction with augmented reality.

For a concrete example distinguishing augmented reality from HUDs, consider again televised American football. A line of scrimmage is shown as an augmentation (augmented reality). The line appears in relation to the field and the players within the real world view. If a camera pans left to look at a coach on a sideline, the center of the field, the players, and the virtual scrimmage line all move off to the right hand side of the view where they will eventually exit the field of view if the camera pans sufficiently to the left. Scores of the competing teams are also usually displayed on televisions. In contrast to the line of scrimmage, the scores are typically superimposed on the view of the game in a top or bottom corner of the television screen. The scores always maintain a corner position in the television. When a camera pans left from the players in the center of the field to a coach on the sideline, the scores in essence move left along with the field of view, so that they maintain the exact same position on the display. The positions of the scores have no associative relationship to the positions of objects in the real world view. In this way, the scores behave like the virtual objects of a HUD as opposed to "augmentations" as generally used herein.

A "camera" as used herein may be digital, analog, or have elements of both camera types. A camera may capture still images or photographs. A camera may capture video (i.e., a video camera). A camera may capture both still images and video. A camera may technically be a combination of cameras the plural outputs of which may be combined to form a single image or video. Generally, a camera includes at least one lens and an image sensor. The lens focuses light, aligns it, and produces a round area of light on an image sensor. Image sensors are typically rectangular in shape, with the result that the round area of light from the lens is cropped to a standard image format. A lens may be a zoom lens or a fixed focal length lens. As of 2017, most mobile multipurpose electronic devices had fixed focal length lens. However, embodiments of the invention may be suited for either type of lens or lenses developed in the future. Lenses may be categorized according to the range of their focal length. Three standard classifications are wide angle, normal, and telephoto. Categorization depends on focal length (or focal length range) and lens speeds. Photographs or videos captured by a camera may be stored digitally, e.g., with pixel values stored on a computer readable medium.

Additional sensors besides the optical elements may be used to collected additional information associated with the captured image(s) or video(s) such as but not limited to location (e.g., GPS coordinates), position, and orientation.

Augmented reality involves defining spatial relationships between virtual objects and real objects, and then making the virtual objects apparent to a user of the augmented reality system in such a way as to combine real and virtual objects in semantic context. For example a visual augmented reality display could use virtual and real objects, and their defined spatial relationships, to generate a combined visual display in the form of a live streaming video (presenting real objects) overlaid with representations of the virtual objects. A spatial relationship between two objects (either or both of which may be virtual or real) may involve one or more of a topological relation, a distance relation, and a directional relation. A topological relation between an object A and an object B may be, for example, A is within B, A is touching B, A is crossing B, A is overlapping B, or A is adjacent to B. Precise spatial relationships between real and virtual objects allow an augmented reality system to generate perceptual experiences in which real and virtual objects are apparently combined seamlessly, e.g. for visual systems the combined presentation is apparently in the correct visual proportions, perspectives, and arrangement. Without correct reckoning of the spatial relationships in such a system, errors in the presentation of the system's output to the user can cause the system to be unusable, e.g. virtual objects appear out of place and therefore are not useful. An example is a virtual visual label that should label one building, but is erroneously shown overlaid onto a different building.

In order to create a visual augmented reality system, in addition to establishing spatial relationships between virtual objects and real objects, the visual perspective into the real world must be matched to the effective visual perspective into the virtual world. Even when the virtual world objects are sized and positioned correctly with respect to their real world counterparts, the determination of which virtual objects are eligible for visual presentation to the user depends on the perspective in the virtual world, which must be matched to the real world perspective of a real world camera in order to take advantage of carefully determined spatial relationships among virtual and real objects. The perspective of a camera may include the position of the camera, the orientation of the camera, and its field of view. One or more of these variables may be used to align a real world view with a virtual world view.

The need for a correctly matched perspective between virtual and real worlds means that in order to provide an accurate spatial relationship between virtual objects and real objects in an augmented reality output, it is necessary to determine aspects of the camera's surroundings. In many AR systems, a camera's surroundings are determined using image processing, including object or feature recognition. Objects or features of a real world image are extracted and matched to reference databases containing data that describes known object or features. A convolutional neural network is an exemplary means for performing image processing and identifying objects or features in the image. In exemplary embodiments herein, image processing may or may not be used. Excluding image processing in the conventional sense may have the advantage of significantly reducing processing resources (e.g., computing time, energy, hardware, and time).

A camera's context and surroundings are also dependent on such variables as the camera's location, the camera's orientation, the camera's pose (i.e., the position and orientation together), and the camera's field of view. In some known AR system, some or all of these variables are ignored entirely, the known systems relying predominantly or entirely on image processing like object recognition algorithms.

Some embodiments of the invention may comprise computer readable storage media that are tangible devices that can retain and store instructions for use by an instruction execution device (e.g., a processor or computer). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or schematic and block diagrams of methods, apparatus (systems), and computer program products according to embodiments of the invention. It will be understood that each block of the flowchart illustrations and/or block diagrams, and different combinations of blocks in the flowchart illustrations and/or block diagrams, may be implemented by or with the use of computer readable program instructions, and in combinations or sequences other than what is explicitly described or shown herein.

These computer readable program instructions may be provided to a processor of a general purpose computer, special purpose computer, or other programmable data processing apparatus (or a plurality of any one or multiple of these) to produce a machine, such that the instructions, which execute via the processor of the computer or other programmable data processing apparatus, create means for implementing the functions/acts specified in the flowchart and/or block diagram block or blocks. "One or more processors" may refer in various embodiments to one or multiple general purpose computers, special purpose computers, or some combination thereof. AR engines and AR-enabled devices may be or comprise processors. Computer readable program instructions may also be stored in a computer readable storage medium that is capable of directing a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks herein.

An "output device", as used herein, is a device capable of providing at least visual, audio, audiovisual, or tactile output to a user such that the user can perceive the output using his senses (e.g., using her eyes and/or ears). In many embodiments, an output device comprises at least one display, at least one speaker, or some combination of display(s) and speaker(s). The output device may also include one or more haptic devices. A suitable display (i.e., display device) is a screen of an output device such as a mobile electronic device (e.g., phone, smartphone, GPS device, laptop, tablet, smartwatch, etc.). Another suitable output device is a head-mounted display (HMD). In some embodiments, the display device is a see-through HMD. In such cases the display device passively permits viewing of the real world without reproducing details of a captured real world image feed on a screen. In a see-through HMD, it is generally only the augmentations that are actively shown or output by the device. Visual augmentations are in any case superimposed on the direct view of the real world environment, without necessarily involving the display of any of the original video input to the system. Output devices and viewing devices may include or be accompanied by input devices (e.g., buttons, touchscreens, menus, keyboards, data ports, etc.) for receiving user inputs. Some devices may be configured for both input and output (I/O).

While the invention has been described herein in connection with exemplary embodiments and features, one skilled in the art will recognize that the invention is not limited by the disclosure and that various changes and modifications may be made without departing from the scope of the invention as defined by the appended claims.

What is claimed is:

1. A method for augmented reality (AR), comprising
receiving, by one or more processors, an image or video containing real world content;
embedding, by the one or more processors, perspective information with the image or video as metadata that moves, copies, and transfers with the image or video, wherein the perspective information describes a camera at a first time the camera captured the image or video;
associating, by the one or more processors, user-specific metadata with the image or video on a per user basis, wherein the user-specific metadata moves, copies, and transfers with the image or video;
moving, copying, or transferring the image or video from a first storage medium to a second storage medium different from the first storage medium;
producing at a second time, by the one or more processors, user-specific AR content comprising virtual augmentations overlaid onto the image or video based on the perspective information and the user-specific metadata, wherein the second time is after the first time,
wherein the perspective information is different from the user-specific metadata.

2. The method of claim 1, wherein the perspective information embedded with the image or video comprises one or more of location, orientation, position, and field of view for the camera at the first time when the camera captured the image or video.

3. The method of claim 2, wherein the perspective information embedded with the image or video comprises location and orientation information.

4. The method of claim 1, wherein the user-specific metadata associated with the image or video differentiates between at least three user types including i) entities responsible for originally capturing the image or video, ii) entities responsible for creating virtual content included in the AR content of the producing step, and iii) entities intended to consume the user-specific AR content produced in the producing step.

5. The method of claim 1, wherein the producing step produces different AR content based on user-specific criteria including one or more a classification, a type, an age, an access level, a demographic, a status, a customer status, and a profession.

6. A method for augmented reality (AR), comprising
collecting or receiving real world perspective information used or usable to define a viewing frustum for an image or video containing real world content;
embedding the perspective information with the image or video as metadata that moves, copies, and transfers with the image or video;
moving, copying, or transferring the image or video from a first storage medium to a second storage medium different from the first storage medium;
applying the viewing frustum to a virtual model configured to model the real world; and
selecting augmentations to include in an AR output, the selection comprising
including for selection only augmentations corresponding with objects that are within a space within the virtual model defined by the applied viewing frustum, and
including for selection only augmentations meeting pre-determined user-specific criteria based on user-specific metadata that moves, copies, and transfers with the image or video,
wherein the AR output is the selected augmentations overlaid onto the image or video,
wherein the perspective information is different from the user-specific metadata.

7. The method of claim 1, wherein the producing step comprises sourcing user-specific AR content from a virtual model that includes virtual representations of at least some of the real world content of the image or video.

8. The method of claim 1, wherein the producing step comprises
determining a real world frustum based on the perspective information,
applying the real world frustum to a virtual world to identify virtual object candidates, the virtual world being modeled after the real world and including at least one virtual location corresponding with at least one real world location that appears in the real world content of the image or video; and
selecting augmentations to apply in the producing step based on the virtual object candidates.

9. The method of claim 8, wherein the virtual object candidates are those objects of the virtual world which are within a space the boundaries of which are defined by the applied frustum.

10. The method of claim 6, further comprising a step of outputting the AR output to one or more users who correspond with the pre-determined user-specific criteria.

11. The method of claim 6, wherein the user-specific criteria differentiate between at least three user types including i) entities responsible for originally capturing the image or video, ii) entities responsible for creating virtual content included in the AR content of the producing step, and iii) entities intended to consume the user-specific AR content produced in the producing step.

12. The method of claim 6, wherein the user-specific criteria include one or more a classification, a type, an age, an access level, a demographic, a status, a customer status, and a profession.

13. A system of AR engines or AR-enabled devices comprising processors configured to execute computer-readable instructions which, when executed, cause the AR engines or AR-enabled devices to
receive, by one or more of the processors, an image or video containing real world content;
embed, by the one or more processors, perspective information with the image or video as metadata that moves, copies, and transfers with the image or video, wherein the perspective information describes a camera at a first time the camera captured the image or video;
associate, by the one or more processors, user-specific metadata with the image or video on a per user basis, wherein the user-specific metadata moves, copies, and transfers with the image or video;

move, copy, or transfer the image or video from a first storage medium to a second storage medium different from the first storage medium;

produce at a second time, by the one or more processors, user-specific AR content comprising virtual augmentations overlaid onto the image or video based on the perspective information and the user-specific metadata, wherein the second time is after the first time, wherein the perspective information is different from the user-specific metadata.

14. The system of claim 13, wherein the perspective information embedded with the image or video comprises one or more of location, orientation, position, and field of view for the camera at the time when the camera captured the image or video.

15. The system of claim 14, wherein the perspective information embedded with the image or video comprises location and orientation information.

16. The system of claim 13, wherein the user-specific metadata associated with the image or video differentiates between at least three user types including i) entities responsible for originally capturing the image or video, ii) entities responsible for creating virtual content included in the AR content of the producing step, and iii) entities intended to consume the user-specific AR content produced in the producing step.

17. The system of claim 13, wherein the producing step produces different AR content based on user-specific criteria including one or more a classification, a type, an age, an access level, a demographic, a status, a customer status, and a profession.

18. The system of claim 13, wherein the producing step comprises sourcing user-specific AR content from a virtual model that includes virtual representations of at least some of the real world content of the image or video.

19. The system of claim 13, wherein the producing step comprises determining a real world frustum based on the perspective information, applying the real world frustum to a virtual world to identify virtual object candidates, the virtual world being modeled after the real world and including locations corresponding with at least one real world location that appears in the real world content of the image or video, and selecting augmentations to apply in the producing step based on the virtual object candidates.

20. The system of claim 19, wherein the virtual object candidates are those objects of the virtual world which are within a space the boundaries of which are defined by the applied frustum.

* * * * *